(12) United States Patent
Hunter et al.

(10) Patent No.: US 7,088,335 B2
(45) Date of Patent: Aug. 8, 2006

(54) METHODS AND APPARATUS FOR ULTRA-VIOLET STIMULATED DISPLAYS

(75) Inventors: Charles Eric Hunter, Hilton Head, SC (US); Laurie McNeil, Chapel Hill, NC (US)

(73) Assignee: Novus Partners LLC, Cincinnati, OH (US)

( * ) Notice: Subject to any disclaimer, the term of this patent is extended or adjusted under 35 U.S.C. 154(b) by 0 days.

(21) Appl. No.: 10/444,079

(22) Filed: May 23, 2003

(65) Prior Publication Data

US 2004/0100437 A1 May 27, 2004

Related U.S. Application Data

(63) Continuation-in-part of application No. 10/133,733, filed on Apr. 29, 2002, which is a continuation of application No. 09/416,333, filed on Oct. 12, 1999, now Pat. No. 6,430,605, which is a continuation-in-part of application No. 09/315,111, filed on May 18, 1999, now Pat. No. 6,424,998, which is a continuation-in-part of application No. 09/301,102, filed on Apr. 28, 1999, now Pat. No. 6,430,603.

(60) Provisional application No. 60/382,623, filed on May 24, 2002.

(51) Int. Cl.
*G09G 3/00* (2006.01)

(52) U.S. Cl. ............... 345/102; 345/207; 345/204; 349/69

(58) Field of Classification Search .......... 345/87–102, 345/204; 349/61–71
See application file for complete search history.

(56) References Cited

U.S. PATENT DOCUMENTS

| | | | | |
|---|---|---|---|---|
| 4,772,888 | A * | 9/1988 | Kimura | 340/825.5 |
| 5,406,305 | A * | 4/1995 | Shimomura et al. | 345/102 |
| 5,748,269 | A * | 5/1998 | Harris et al. | 349/58 |
| 5,786,801 | A * | 7/1998 | Ichise | 345/102 |
| 5,793,221 | A * | 8/1998 | Aoki | 324/770 |
| 5,854,617 | A * | 12/1998 | Lee et al. | 345/102 |
| 6,144,164 | A * | 11/2000 | Ito | 315/169.3 |
| 6,188,379 | B1 * | 2/2001 | Kaneko | 345/102 |
| 6,195,196 | B1 * | 2/2001 | Kimura et al. | 359/295 |
| 6,469,755 | B1 * | 10/2002 | Adachi et al. | 349/62 |

* cited by examiner

*Primary Examiner*—Lun-Yi Lao
(74) *Attorney, Agent, or Firm*—Frost Brown Todd LLC

(57) ABSTRACT

A display element for use in a display device that exhibits extended illumination longevity and uniformity, as well as a wide viewing angle, is provided. The element can include a light source that emits ultraviolet light, a liquid crystal device having a plurality of independently controllable (i.e., addressable) shutters, a screening element between the light source and the liquid crystal device, a plurality of luminescent elements optically aligned with the shutters, and a regulated power supply. Display devices, calibration techniques, and power management methods are also provided.

44 Claims, 10 Drawing Sheets

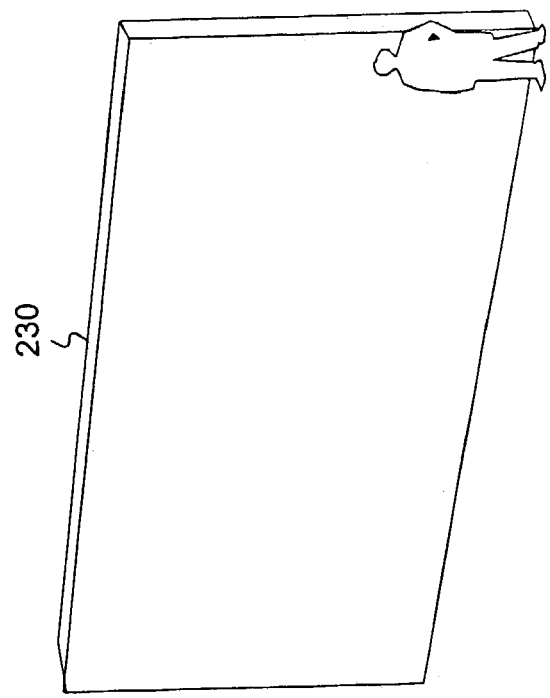
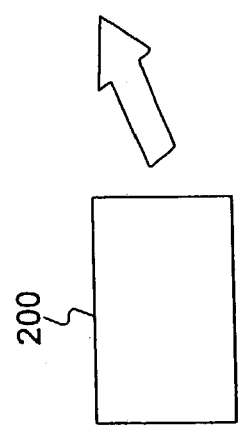
FIG. 4

Customer: ABC Cola Co.

Ad Content: Ocean Scene with graphics
(content code 1111)

Location: Atlanta, Georgia, Interstate 75N, milepost 125
(site code XXXX)

Time: 7:30 AM, June 30, 2000

Vehicle Count: 225

Viewer Count: 340

Viewer Demographics: 50% Resident Cobb County, GA

Median household income: $60,000/yr.
30% Resident DeKalb County, GA

Median household income: $52,000/yr.
20% Median household income $55,000/yr.
Advertising Cost: $X

FIG. 5

Customer: ABC Cola Co.

Ad Content: Mountain Scene with graphics (content code 2222)

Locations: 100 sites (site codes YYY....ZZZ)

Time: 8:30 AM, July 10, 2000

Total Vehicle Count: 21,500

Total Viewer Count: 37,200

Viewer Demographics: Median household income, $49,500

Advertising Cost: $Y

FIG. 6

METHODS AND APPARATUS FOR ULTRA-VIOLET STIMULATED DISPLAYS

CROSS-REFERENCE TO RELATED APPLICATIONS

This is a continuation-in-part of U.S. patent application Ser. No. 10/133,733, filed Apr. 29, 2002, which is a continuation of U.S. patent application Ser. No. 09/416,333, filed Oct. 12, 1999, now U.S. Pat. No. 6,430,605, which is a continuation-in-part of U.S. patent application Ser. No. 09/315,111, filed May 18, 1999, now U.S. Pat. No. 6,424,998, which is a continuation-in-part of U.S. patent application Ser. No. 09/301,102, filed Apr. 28, 1999, now U.S. Pat. No. 6,430,603, and claims priority to U.S. Provisional Patent Application No. 60/382,623, filed May 24, 2002, all of which are hereby incorporated by reference in their entireties.

BACKGROUND

The invention relates to the display of video or still image content on electronic display devices. More particularly, the invention relates to luminescent-type displays that are ultra-violet light stimulated, networks that include such displays, such as electronic billboards or electronic digital movie displays, and related systems that permit display of content on selected displays according to customer dictates.

1. Electronic Display Devices

Liquid crystal displays are well known, but applications of these devices are still plagued by a variety of problems, including limited viewing angle, longevity, and manufacturing cost. For example, Crossland et al. U.S. Pat. No. 6,285,345 describes a liquid crystal display that includes a light source that produces activation light at a predetermined narrow range of UV wavelengths, a collimator for directing the activation light in parallel in a predetermined direction, a LC cell formed from an array of pixels, a photoluminescent screen on the cell arranged to emit a visible output when struck by the narrow-band excitation light passing through the cell, and a drive circuit for addressing the LC cell in a multiplexed manner. According to Crossland et al., the direction of light and the thickness of the cell are chosen to give the best contrast ratio for the liquid cell. Crossland et al. does not address the problem of light source failure and illumination nonuniformity across the screen.

Filters for liquid crystal displays are also known. For example, Honda et al. U.S. Pat. No. 5,851,700 shows a filter that has a light diffusing plate formed from a film containing at least two photopolymerizable oligomers or monomers. According to Honda et al., "[w]hen the filter is fitted to a light emitting side of a liquid crystal display device, an angle of view of the liquid crystal display face plane is widened, shadows due to opaque parts of the device are reduced, and a Moire fringe is hardly formed" (Abstract). Honda et al. also does not address light source failures that can shorten the lifespan of the device nor illumination nonuniformity that can adversely affect a viewing experience.

Moreover, high efficiency fluorescent lamp devices are known that include UV stimulated phosphors. For example, Armstrong et al. U.S. Pat. No. 5,502,626 shows a lamp that includes a UV light source (i.e., a mercury arc producing tube) within an enclosure that excites a phosphor coating applied to an interior surface of the enclosure. Armstrong et al. provides geometric formations on the interior surface to increase the oblique surface area to increase the amount of phosphor without using a thick coating. Still, Armstrong et al. does not address light source failure and illumination nonuniformities.

Thus, there is a need for electronic display devices that provide a wide viewing angle, an extended longevity, and minimal illumination nonuniformities.

2. Advertising/Billboards

Consumer product advertising takes many forms, such as television commercials, newspaper and magazine advertisements, mailings, point-of-sale displays, outdoor billboards, etc. Using current advertising media, advertisers engage in a constant struggle to efficiently use their budgets to effectively reach their geographic and demographic targets.

Focusing on the outdoor advertising component of advertising by consumer product companies, it is well known that outdoor billboards have traditionally taken the form of single-message displays formed of printed sheets or painted surfaces containing the advertising content adhered to a flat backing. This time-honored outdoor advertising technique has remained essentially unchanged throughout the twentieth century. The high cost of printing, transporting, and mounting a message on a conventional billboard has dictated that the same message remain in place for a considerable period of time. Thus, a conventional billboard cannot be readily be changed to reflect current events within the geographical area of the billboard.

Additionally, the content on a conventional billboard tends to become essentially "invisible" as a part of the landscape after its content has been in place for a relatively short period of time, especially to commuters and others who regularly pass the billboard. Beyond the above problems with cost, single-message content, lack of content changeover capability, and the like, conventional outdoor billboards have come under increasing criticism because in their large numbers, and often tattered condition, they clutter highways with a distasteful form of visual "pollution". A reduction in the number of billboards and improvement of the appearance of those that remain, if accomplished while increasing the overall advertising impact afforded by outdoor advertising, would please virtually everyone.

The use of electronic billboards has been suggested, for example, in U.S. Pat. No. 5,612,741. However, applicants lack of no electronic billboard network in operation whereby commercial advertisers may directly place ads onto selected billboards at selected times through direct access to a master network. Such a network, properly designed and operated, promises to overcome the numerous disadvantages currently associated with the outdoor advertising industry, while also meeting the above needs of consumer products advertisers.

3. Distribution and Display of Movies at Movie Theaters

For virtually the entire twentieth century the practice of distributing movies on film reels to movie theaters has gone fundamentally unchanged. As is well known, movie content is stored on large reels of film, one or more copies of which must be physically transported to each movie theater where the movie will be shown. The films are bulky, heavy, and expensive to reproduce and ship to movie theaters. Films also show wear and eventually must be removed from use. Obviously, a movie theater's ability to show a particular movie is subject to the film reels being physically present at the proper time. Thus, substantial lead time must be provided anytime a movie theater operator is preparing the schedule for his screen(s).

In addition to the above problems inherent in the current movie distribution scheme, the high cost of conventional film reel movie distribution results in most movies not going to full distribution. In this regard, the full distribution of a movie (e.g., the cost of film reels and their transportation) can cost four to five million dollars or more. As a related problem, the cost of making film reels of older movies, particularly non-"blockbuster" movies, which are available on an ongoing basis, is prohibitive. Thus, theater owners and movie goers are deprived of movie theater screening for the vast majority of available movie content because the movies are not in current distribution. Moreover, content providers (e.g., Disney, Warner Brothers, etc.) are deprived of the revenue from the movies for which ongoing, continuous distribution is simply too expensive.

Thus, there is a need for a new movie distribution system that will overcome the above shortcomings of current movie distribution practices.

SUMMARY

Consistent with one aspect of the present invention, a display element for use in a display device that exhibits a wide viewing angle, extended longevity, and which improves illumination uniformity can be provided. The element can include at least a first light source that emits ultraviolet light, a liquid crystal device having a plurality of independently controllable (i.e., addressable) shutters, a screening element between the light source and the liquid crystal device, and a plurality of luminescent elements optically aligned with the light source and each of the shutters, wherein each of the luminescent elements absorbs at least some of the ultraviolet light and converts it to visible light.

According to another aspect of the present invention, a display device can be provided that can include a plurality of light sources that each emits ultraviolet light, a plurality of independently controllable shutters, a plurality of luminescent elements optically aligned with the light source and each of the shutters, wherein each of the luminescent elements can absorb at least some of the ultraviolet light and convert it to visible light, and a regulated power supply for supplying power to the light source. The device can further include a screen between the light source and the liquid crystal device.

According to yet another aspect of the present invention, a system can be provided that permits display content (e.g., video or still image content) to be displayed on selected ones of multiple, networked electronic displays at selected times according to dictates of the customers of the system.

According to one embodiment of the invention, commercial advertisers, such as consumer product companies and the advertising agents that represent them, can directly access a network of multiple, large, high resolution electronic displays located in high traffic areas and directly send their own advertisements electronically to the network to be displayed at locations and times selected by the advertisers. In one particular embodiment, the invention can include a central information processing center that permits customers to review a schedule of times and electronic display locations that are available for placement of advertisements, and permits customers to purchase available time slots at selected electronic display locations for placement of their advertising content. A customer can then transmit advertising content to the processing center where the content is reviewed for appropriateness and transmitted to one or more customer-selected electronic displays.

In some embodiments, the electronic display devices are large (e.g., 23×33½ ft.) flat LED display devices that are driven by dedicated video or image servers. Verification that the advertisements run as ordered can be facilitated by an information storage module or by a digital camera or series of digital cameras. A traffic counter may be used to determine the traffic that passed by the display while the advertisement was running. Bills and reports containing market and demographic analysis can be generated and sent to the customer.

In another illustrative embodiment of the invention, operators of digital movie theaters have ongoing, continuous access to tens of thousands of movies that can be ordered in digital form for display on selected "screens" at their theaters at selected times. The movie theater operator is a customer of a system that permits the customer to review movies that are available in digital form and thereafter schedule and purchase a movie for display on the digital movie screens located at the customer's movie theater.

The movies can be transmitted by the system to the movie theater operators by a number of transmission modes, including a satellite uplink/downlink system that transmits movie content in non-real time (allowing faster transmission speeds) in encoded digital format, with a decoder at the movie theater to protect against piracy. The system can include means for generating bills to the customers and forwarding the bills for debit payment. The system may also include means for generating royalty payment information for use in paying the content providers for the display of their movies.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 4 shows a perspective view of another illustrative electronic display that can be used, as shown in FIG. 1, consistent with this invention;

FIG. 5 shows an illustrative simplified report for an advertisement provided to a single display consistent with this invention;

FIG. 6 shows an illustrative simplified report for an advertisement provided to multiple consistent with this invention;

DETAILED DESCRIPTION OF THE INVENTION

Figure 1:
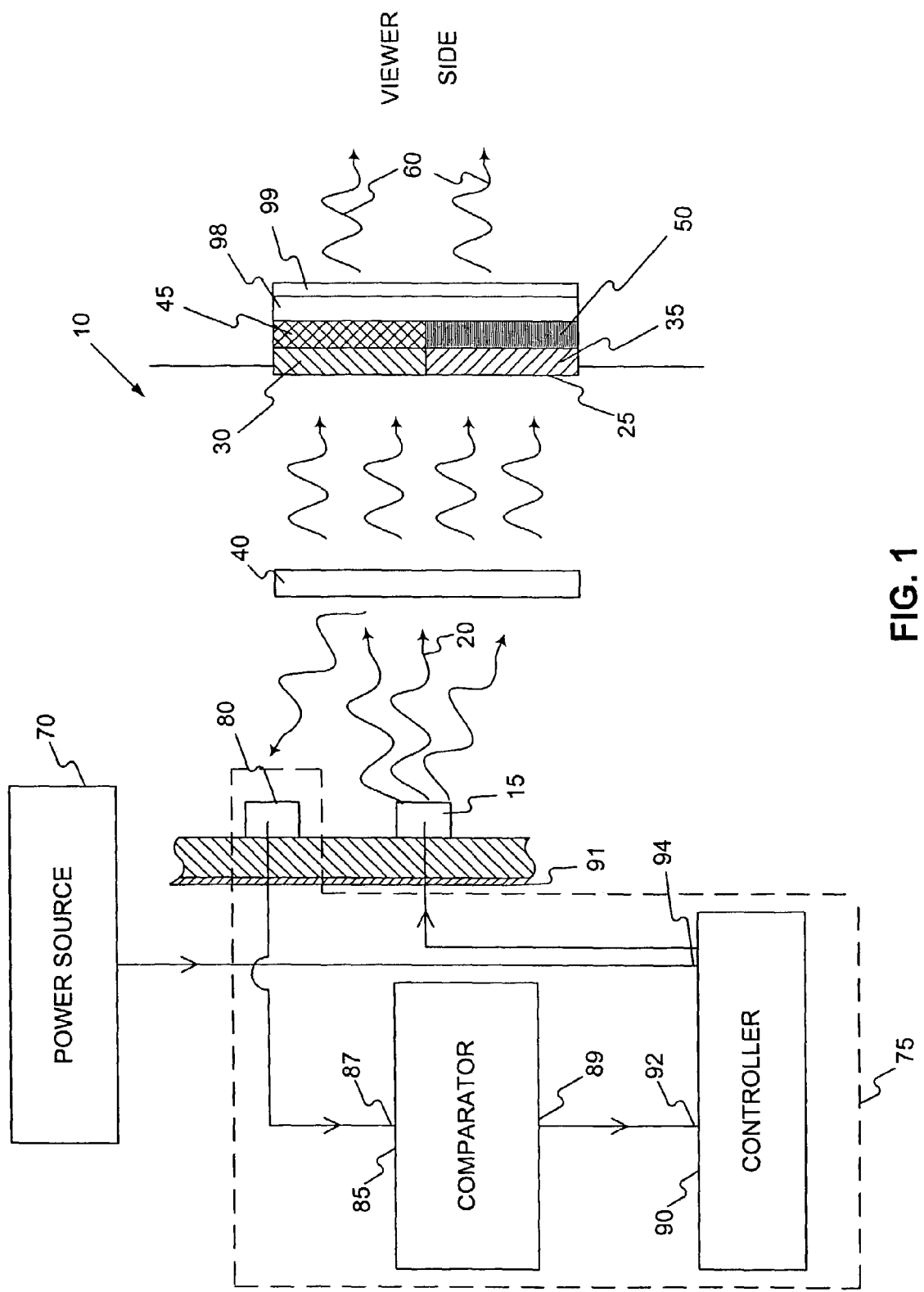
FIG. 1 shows an illustrative display element consistent with this invention.

FIG. 1 shows an illustrative display element 10 consistent with this invention for use in an electronic display device. It will be appreciated that the physical dimensions shown in FIG. 1 are not to scale and are in some cases exaggerated for illustrative clarity.

Element 10 includes at least a first light source 15 that emits ultraviolet light 20, a liquid crystal device 25 having a plurality of independently controllable (i.e., addressable) shutters 30 and 35, a screening element 40 between light source 15 and a liquid crystal device 25, and a plurality of luminescent elements 45 and 50 that are optically aligned with shutters 30 and 35, respectively. During operation, each of elements 45 and 50 absorbs at least some of ultraviolet light 20 and converts it to visible light 60.

Light source 15 can be, for example, any ultraviolet light emitting diode (hereinafter, "LED"). Typically, an LED is a device that emits optical radiation when biased in the forward direction. In one embodiment, the LED can be made from a material, such as a semiconductor, having a band gap that is greater than about 2 eV. As described more fully below, examples of materials that have such a band gap include gallium nitride, aluminum nitride, gallium indium nitride, and other such alloys (such as one sold under the trademark MEGABRIGHT™, available as part no. C395-MB290-E400 from Cree, Inc., of Durham, N.C.).

Although any ultraviolet light-emitting solid-state material can be used in accordance with this invention, there are two primary classes of ultraviolet light-emitting solid-state materials, including nitrides ($In_{1-x-y}Al_xGa_yN$ compounds) and zinc chalcogenides ($ZnS_{1-x}Se_x$; other cations, such as cadmium, can also be incorporated).

The nitrides can be formulated to emit at any desired wavelength between about 200 nm and about 400 nm by adjusting the values of x and y appropriately. The zinc chalcogenides can also be formulated to emit at any desirable wavelength between about 350 nm and about 450 nm range by adjusting the value of x and depending on the substituted cation. The nitrides are sometimes better suited to excite phosphors that have maximum absorption in the shorter wavelength range; the zinc chalcogenides are sometimes better suited for phosphors that absorb at longer wavelengths. Zinc fluoride doped with gadolinium (i.e., $ZnF_2$:Gd), which has a narrow emission band at 311 nm, can also be used consistent with this invention to produce relatively short-wavelength light that is well matched to the absorption bands of a number of phosphors.

Generally, an appropriate solid-state ultraviolet light source can be chosen to stimulate previously selected luminescent elements, or phosphor compounds. It will be appreciated that the ultraviolet light source should be chosen such that its peak wavelength is near the peak absorption wavelength of the phosphor compound. When a single source is used to illuminate multiple color phosphor compounds, each of the phosphor compounds can have a similar ultraviolet light peak absorption wavelength.

In one embodiment, light source 15 is operated at substantially below its rated capacity to extend its lifetime. In particular, the power supplied to light source 15 can be less than 30% of its nominal power requirements. In this case, two or more LEDs can be aggregated to supply a desired ultraviolet light intensity at shutters 30 and 35. The light sources can be aggregated, as described above, or distributed uniformly or non-uniformly. When light sources are arranged to emit light over a common area, the power supplied to each of the light sources can be automatically adjusted using a closed-loop feedback scheme to provide a substantially uniform intensity profile over shutters 30 and 35. Thus, one or more metrics, such as an electrical resistance of an LED or the emitted ultraviolet or visible light intensity, can be monitored and used as a feedback signal for adjusting the power supplied to one or more LEDs.

For example, when an LED fails, its electrical resistance may abruptly change or the intensity of ultraviolet light emitted may fall below an acceptable threshold level. If the power supplied to one or more LEDs is continuously or periodically monitored, the power can be increased or shifted to another LED to accommodate for the failed light source. In another embodiment, one or more light sources can be turned on when other sources have failed or no longer meet certain minimum operating criteria. For example, in one control scheme, when a first light source is determined to have failed or operating at an unacceptably low level, a second light source can be automatically turned on to compensate for the first light.

Although only two shutters (e.g., shutters 30 and 35) are shown in FIG. 1, it will be appreciated that any number of shutters can be associated with a single light source. In particular, the stronger the light source the more shutters it can illuminate.

Preferably, electroluminescent elements 45 and 50 are disposed on the viewer side of addressable shutters 30 and 35, respectively. This arrangement has the advantage that ultraviolet light will only be incident on luminescent elements 45 and 50 when those elements are in use, which increases their useful lifetimes. Thus, each of shutters 30 and 35 should have a variable transmissivity at the ultraviolet wavelengths emitted by light source 15. In one embodiment, at least three shutters and at least three luminescent elements that luminesce at three different colors (e.g., red, green, and blue) are associated with a single LED. If the LED is strong enough, two or more sets of three or more shutters each can be used with respective sets of luminescent elements.

Consistent with this invention, a visible color can be generated by illuminating a single luminescent element or by forming a composite color by illuminating two or more adjacent luminescent elements. Two or more visible colors can be mixed by simultaneously or sequentially illuminating the luminescent elements. When a composite color is formed by illuminating two or more luminescent elements sequentially, that illumination sequence must be performed in a sufficiently short period of time such that the human eye cannot distinguish individual luminescent events (e.g., less than about $\frac{1}{30}^{th}$ of a second, however this depends on the amount of temporal compression, frame activity, etc.). For example, by sequentially illuminating a blue element and a red element for $\frac{1}{60}^{th}$ of a second each, a medium magenta can be formed. Different shades of magenta can also be formed by illuminating blue and red elements with varying intensities of ultraviolet light or different periods of time (e.g., illuminating a blue luminescent element for a first period of time and a red luminescent element for a different period of time, such that the sum of the two periods is less than about $\frac{1}{30}^{th}$ of a second).

Furthermore, it will be appreciated that both ultraviolet illumination intensity and period can be varied to generate a wide range of colors. Moreover, the number of potential colors will increase with the number of luminescent elements and the number of potential illumination intensity settings and time period intervals.

Screening element 40 of display element 10 can be arranged between light source 15 and device 25 to diffuse ultraviolet light 20 before it is incident on device 25. Screening element can be used to diffuse ultraviolet 20 to make it substantially more uniform across the surface of device 25. Preferably, screening element 40 can also collimate, or redirect, ultraviolet light 22 toward device 25, and particularly to its constituent shutters, to increase the intensity of ultraviolet light at each shutter. It will be appreciated that if the screening element both diffuses and collimates, the screening element could include at least two portions that perform each of the respective functions.

In one embodiment, luminescent elements 45 and 50 can be disposed directly on a viewer side of the liquid crystal device. Luminescent elements can include different luminescent materials that luminesce at different colors, including a substantially white color (see, e.g., the materials used to produce white light in Duggal et. al. U.S. Pat. No. 6,294,800). It will be appreciated that the material used to form the luminescent elements can be, for example, a semiconductor, a phosphor, a gas, a plasma, an organic pigment, an inorganic pigment, and any combination thereof. Additional materials will be described more fully below with respect to display devices that can be built consistent with this invention.

Thus, sources of blue, green, and red light at each pixel can be composite devices that include an ultraviolet LED that excites a luminescent element that, in turn, produces light of a selected spectrum. As described more fully below, the ultraviolet LED can be formed from a GaN or GaN-containing compound on sapphire with or without suitable buffer layer, or a GaN or GaN-containing compound on SiC, preferably with a suitable buffer layer, or an AlN or AlN-containing compound on AlN, sapphire, SiC or GaN, with or without a suitable buffer layer.

In one embodiment, ultraviolet LEDs can be incorporated into three different composite devices, each with a different luminescent element for producing blue, green, and red, respectively. In another embodiment, a luminescent element (e.g., a phosphor) can be selected to produce white light and a desired color is produced by passing the white light through a band pass filter. According to this white-light embodiment, filters of blue, green, and red may be used to create discrete composite devices that produce blue, green, and red light at each pixel. The use of white light with appropriate band pass filters has the advantage of producing a colored light with an excellent wave length distribution that will not change appreciably over time, a desirable property for color balancing. On the other hand, the use of three different luminescent elements to directly produce blue, green, and red without a filter has the advantage of higher efficiency because light is not filtered out. Both approaches have the advantage of excellent persistence which, as known in the art, is a desirable feature that is especially important in video applications, particularly digital movie theater applications that are discussed in more detail below.

Two broad categories of phosphor compounds that can be used consistent with this invention are (1) rare-earth-activated compounds (e.g., oxides, borates, phosphates, and silicates doped with europium, terbium, cerium, or gadolinium); and (2) metal-activated zinc compounds (e.g., zinc chalcogenides doped with silver, copper, or aluminum). The rare-earth activated compounds have stronger absorption in the short-wavelength range (typically <350 nm), and thus are well matched with nitride UV emitters (see below). The rare-earth activated compounds also tend to have a narrow range of emission wavelengths, since the emission is by the rare-earth ion. In many cases, the metal-activated zinc compounds absorb well at longer wavelengths (>300 nm) and thus are well matched with metal-activated zinc UV emitters. It will be appreciated, however, that either type of phosphor compound can be matched with either type of UV-emitter.

Illustrative examples of rare-earth-activated phosphors that can be used consistent with this invention are provided below. Examples of rare-earth-activated phosphors that emit red light include: $Y_2O_3$:Eu, $(Y,Gd)BO_3$:Eu, $(Y,Gd)PO_3$:Eu, $YVO_4$:Eu, and $Zn_2SiO_4$:Eu. All of these examples emit a series of narrow visible bands between about 590 nm and about 620 nm. Examples of rare-earth-activated phosphors that emit green light include: $(Y,Gd)BO_3$:Tb, $LaPO_4$:(Ce, Tb), $(Ce,Tb)MgAl_{11}O_{19}$, $(Gd,Ce,Tb)MgB_5O_{10}Y_3Al_5O_{12}$:Ce. The Tb-doped compounds emit a narrow band of visible light at about 540 nm and the Ce-doped compounds emit a narrow band at about 550 nm. Examples of rare-earth-activated phosphors that emit blue light include: $Y_2SiO_5$:Ce, $BaMgAl_{10}O_{17}$:Eu, $Sr_5(PO_4)_3Cl$:Eu, and $LaPO_4$:Tm. The Ce-doped compounds have peak emission between about 400 nm and about 450 nm. The Eu-doped and Tm-doped compounds have a peak emission at about 450 nm.

Illustrative examples of metal-activated phosphors that can be used consistent with this invention are provided below. Examples of metal activated phosphors that emit green light include: ZnCdS:Ag, ZnS:Cu,Al, and $Zn_2SiO_4$:Mn, all of which emit light between about 520 nm and about 560 nm. An example of a metal-activated phosphor that emits blue light is ZnS:Ag, which has an emission peak at about 460 nm.

During luminescent element, or phosphor, selection, chromaticity should be considered to ensure that the display device with a wide color range. Each visible color has a chromaticity (i.e., color coordinates), that corresponds to a location on the 1931 Commission Internationale de l'Eclairage ("CIE") chromaticity diagram. The chromaticity of a display device can be controlled using phosphors that are saturated, that is phosphors that have the largest possible values of the color coordinates x and y. Phosphors with narrow emission bands have more saturated emission and, in some cases, may be preferred. Thus, consistent with another aspect of this invention, the emission can be tuned in color coordinate space (or peak wavelength) by co-doping with two or more species in the oxide or chalcogenide host. The interaction of the dopants can reduce the emission width, thereby enhancing emission saturation.

Material processing and degradation effects should be considered when selecting phosphors and constructing display devices consistent with this invention. Inorganic phosphors, such as the ones identified above, generally have long working lifetimes and are less susceptible to degradation, when compared to organic materials such as laser dyes.

Inorganic phosphors can be deposited in several ways. A simple way involves embedding small particles (e.g., between about 1 micron and about 20 microns) in a polymer matrix. In a preferred embodiment, the polymer host is reasonably transparent to UV light and relatively impervious to UV-induced degradation. Methyl, ethyl, and butyl methacrylates are suitable host materials. The phosphor layer can be deposited by suspending the particles in a polymer solution, spin-coating or depositing using another standard solution deposition technique, and then baking the compound to drive off the solvent.

Another deposition technique involves suspending the particles in the polymer precursor that can be polymerized in situ. Although this technique is simple to implement, films produced using this technique could have a number of disadvantages including: a lack of uniformity, relatively high surface roughness (which can lead to significant reflection, rather than absorption, of the incident UV light), and a more rapid degradation due to the lack of robustness of the polymer under UV light and chemical attack.

When selecting phosphor compounds for use in display devices consistent with this invention, the thickness and grain morphology of the phosphors should be considered, as well as the intrinsic absorption and emission efficiency. In one embodiment, the phosphor coating should be thick enough to maximize absorption of the incident UV light, but thin enough to maximize transmission of the emitted visible. This is because thicker phosphor coatings can enhance UV absorption at the expense of visible light transmission. Multiple scattering of the UV light can be desirable because it makes UV absorption more likely. Scattering can be enhanced using even smaller particle sizes (e.g., about 3 microns). A preferred phosphor compound thickness appears to be between about 5 microns and about 15 microns, and more preferably about 10 microns, or about three layers.

Phosphors can also be deposited in thin-film form by sputtering or solution deposition. Such films tend to be substantially uniform, smooth, and more impervious to degradation due to radiation and chemical exposure. Their homogeneous physical structure, however, reduces the internal scattering of the incident UV light and thus the efficiency of the absorption. The processing temperatures for oxide materials are higher than those for chalcogenides.

It will be appreciated that energy sources other than ultraviolet LEDs can be used to excite the luminescent elements of the composite devices discussed above.

In the case of low ambient lighting conditions, such as in digital movie theaters, lower power LEDs can be used. Higher power LEDs can be used to provide a light source for an LCD shutter-type screen in high ambient lighting conditions.

Display element 10 can further include a regulated power supply for supplying a regulated power level to light source 15. Regulated power supply can include power source 70 and regulation circuit 75 coupled to power source 70 and light source 15.

Regulation circuit 75 can include photodetector 80, comparator circuit 85, and controller 90. Photodetector 80 can detect a portion of the ultraviolet light emitted from light source 15 and generate a first signal indicative of an intensity of the portion of ultraviolet light. Comparator circuit 85 has input 87 for receiving the first signal. Comparator circuit 85 can compare the first signal with a baseline signal and generate a second signal that is proportional to the difference between the first signal and the baseline signal. Controller circuit 90 can have input 92 coupled to output 89 of comparator 85 for receiving the second signal and output 94 for supplying a regulated power signal to light source 15.

In one embodiment, photodetector 80 is positioned such that the portion of detected ultraviolet light is a portion reflected from screening element 40. In another embodiment, photodetector 80 is positioned such that the portion of detected ultraviolet light reflects from some other element, such as a small ultraviolet mirror that is placed in front of light source 15. In either case, photodetector can include a detector that detects the intensity of the ultraviolet light.

Photodetector 80 can be constructed from any other material that has a relatively low dark current and an acceptable D* value. D* is a value used to designate the relative sensitivity of a detector. Generally, the higher the D* value, the better the detector. For example, silicon carbide, especially silicon carbide of the 4H or 6H type, can be used to construct a UV-sensitive photodetector according to this invention. It will be appreciated that, in addition to silicon carbide, GaAs, InGaN, GaN, and other materials used to make photodetectors can be used consistent with this invention.

In another embodiment, photodetector 80 is positioned such that the portion of detected light is a portion of visible light emitted from one or more luminescent elements. In this case, the photodetector includes a detector that detects the intensity of visible light.

Consistent with this invention, detector 80 can be used to perform illumination calibration procedures. Calibration can include, for example, supplying a known amount of power to one or more light sources, measuring one or more intensities of light, and adjusting the power supplied to the one or more light sources. Each light intensity can be measured optically or electronically. There are a number of optical measurement techniques that may involve the use of an ultraviolet or visible photodetector. The adjustment of the power supply can involve increasing or decreasing the power supplied to the light source until the measured light intensity reaches a desired level. That level may be fixed or variable.

For example, a variable level can be used to accommodate for decreasing or uneven LED or luminescent conversion efficiencies. The term "uneven" refers to varying performance efficiencies by different display elements. Similarly, luminescent materials normally experience decreasing conversion efficiencies when exposed to ultraviolet light for an extended period of time. Also, ultraviolet LEDs can emit less light over extended periods. It will be appreciated that calibration according to this invention can be performed before, during, or after regular operating sessions. It will also be appreciated that optical calibration according to this invention measures, in some fashion, a light intensity at a known electrical power supply level.

Electrical calibration is also consistent with this invention by monitoring, for example, an electrical resistance or the electrical current supplied to one or more of the light sources. In this case, the intensity of ultraviolet or visible light can be inferred from the electrical measurement. Controller circuit 90 can be, for example, a voltage controller or a current controller. Preferably, controller circuit 90 includes an auto-zeroing feature that minimizes dark current when a shutter is closed.

Cooling plenum (not shown) can be in thermal communication with any or all heat generating components, including especially light source 15. The plenum normally includes a cooling material, such as a gas or fluid, and can include a circulation motor for circulating the air or fluid.

Display element 10 can also include one or more filters. Protective filter 98 can be placed on a viewer side of luminescent elements 45 and 50 to remove potentially harmful ultraviolet radiation that may pass through luminescent elements 45 and 50. Thus, such light could include wavelengths that correspond to energies that are greater than about 2 eV. Filter 98 can be a coating disposed directly on luminescent elements 45 and 50 or on another filter, such as a wavelength stabilizing filter 99, which is discussed below. Alternatively, filters 98 can be discrete from liquid crystal device 25 in the form, for example, of a plate (not shown).

Optical stabilizing filter 99 is also placed on the viewer side of luminescent elements 45 and 50 and transmits a portion of the visible light generated by those elements. The purpose of stabilizing filter 99 is to compensate for the wavelength dependent effects that normally accompany long operating lifetimes. Thus, a luminescent element can have a dominant visible wavelength that changes with time and stabilizing filter 99 ensures that only the desired (e.g., calibrated) wavelengths pass through to a viewer. Like protective filter 98, stabilizing filter 99 can be a coating disposed directly on luminescent elements 45 and 50 or on another filter, such as protective filter 98, which is discussed below. Alternatively, stabilizing filter 99 can also be discrete.

Figure 2:
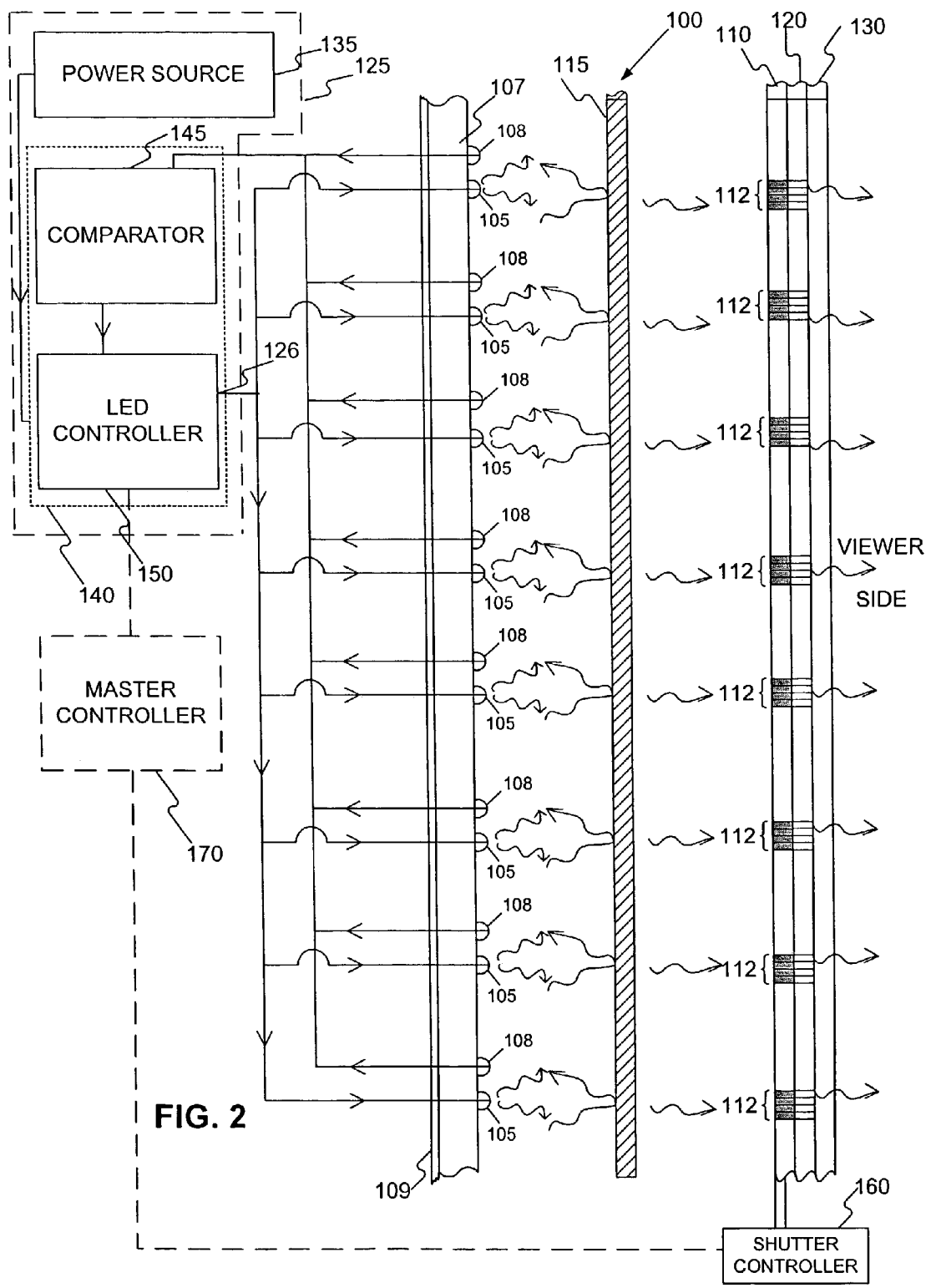
FIG. 2 shows an illustrative display device consistent with this invention.

FIG. 2 shows a schematic view of a display device 100 that can be built consistent with this invention. Display device 100 can include a plurality of light sources 105, each of which emits ultraviolet light, a plurality of independently controllable shutters 110, a screen 115 between light sources 105 and shutters 110, a plurality of luminescent elements 120, and a regulated power supply 125 for supplying power to light sources 105. As described above, each of luminescent elements 120 can absorb at least some of the ultraviolet light and convert it to visible light. In one embodiment, luminescent elements 120 can be optically aligned with shutters 110. When plurality of independently controllable shutters 110 includes liquid crystals, then shutter controller 160 can be used to apply appropriate electric field across each of shutters 110 to open and close individual shutters or groups of shutters, as required.

As described more fully below, each of light sources 105 can be an ultraviolet light emitting diode that uses a material having a wide band gap (e.g., a band gap that is greater than about 2.0 eV). As shown in FIG. 2, each of light sources 105 can be surface mounted to substantially planar or curved structure 107 (e.g., electronic board). Alternatively, each of light sources 105 can be integrated in such a structure.

In one embodiment, each of light sources 105 can be arranged in a substantially two-dimensional array. Power supply 125 can supply electrical power to each of light sources 105 such that each of shutters 110 has substantially the same amount of ultraviolet light incident on it. Although FIG. 2 only shows power supply 125 having one output 126 for all light sources, it will be appreciated that supply 125 can have multiple outputs to supply different power levels to light sources 105 individually, or in groups. In this way, power management schemes can be used to periodically or continually adjust the amount of electrical power supplied to each of light sources 105. For example, power supplied to one or more of light sources 105 can be increased upon failure of another of light sources 105. More generally, the power supplied to each of light sources 105 can be regulated such that:

$$I_{total} = \sum_{i=1}^{k} I_i$$

where $I_i$ is the intensity of light incident on a particular shutter emitted by a contributing light source i, $I_{total}$ is the total intensity of light incident on the shutter, and k is the number of light sources that contribute to the incident light on the shutter. In one embodiment, the electrical power levels supplied to the light sources are adjusted such that every shutter has the same total incident ultraviolet light intensity. In another embodiment, the electrical power levels supplied to the light sources are adjusted such that every luminescent element generates the same intensity of visible light when its respective shutter is opened.

Thus, if one or more of the light sources generates less than a desired intensity, the power supplied to one or more different light sources can be increased. In this way, for a particular set of light source power levels, substantially the same amount of ultraviolet light can be incident on each of shutters 110, or the same amount of visible light can be generated by each luminescent element when a shutter is open. In one embodiment, optimization routines can be periodically or continually performed to ensure substantially uniform illumination over each of shutters 110.

The provision of one or more high resolution, highly aligned digital cameras at each display site, for example the camera or cameras utilized in digital camera and traffic count recorder 320 (FIG. 3), or other specifically dedicated cameras, provides a means permitting in situ diagnostics and calibration of the displays. As known in the art, certain digital cameras have a resolution of over 7,000,000 pixels—as compared to approximately 172,000 pixels on the above-described 23×33½ ft. display. Thus, by directing a digital camera at a display, or directing multiple digital cameras at different discrete portions of a display, a correspondence can be attained where a portion of each digital camera's image corresponds to a single pixel or group of pixels in the display. Suitable means for aligning the digital camera with the display can be used, including optical means, such as laser alignment marks.

In another embodiment, multiple digital cameras can correspond to the same portion of a display (or the entire display). In this case, the images generated by those cameras can be compared and used to improve the accuracy and precision of the diagnostic and calibration procedures.

At selected times set aside for diagnostics and calibration, such as a five minute period each night, the entire display or portions thereof can be run red, then green, then blue, followed by white, all at multiple power levels. In order to reduce interference, the LEDs can be switched on individually for a short period, for example one millisecond each. In the most basic diagnostic operation carried out when the display is run red/green/blue, the camera(s), mounted at a selected distance from the display such as sixty feet away, are capable of detecting nonfunctioning or excessively degraded LEDs for replacement.

Beyond replacing defective LEDs, each night the system may automatically re-calibrate all LEDs in the display, as described above. To this end, the display is run red/green/blue at several iterative power levels (e.g., 20%/40%/60%/80%/100%) and the optical power output of each LED is sensed for each power level, with the goal being to calibrate the system so that each red, green or blue LED has the same optical power output at each power level as do the other LEDs of the same color. Electronic calibration is also possible according to this invention. Calibration preferably is achieved by diode recalibration scalar software (e.g., look up table) that can be associated with a scalar (not shown) that acts independently in conjunction with the video converter/scalar at 280 (FIG. 4).

Diode recalibration scalar can receive information from the diagnostic equipment indicating the optical power output of each LED at the various supplied power levels and, through an associated automatic calibration LED look-up table, accounts for daily variance in LED output (degradation or increase) by adjusting the power curve by which the LED will be driven the next day. This periodic (e.g. daily) in situ recalibration has the benefit of greatly reducing on site maintenance since LEDs that have degraded can be run harder to compensate for the degradation (see above), eliminating the need for frequent replacement.

As an alternative to using digital cameras for the diagnostic and calibration function, miniature photodetector chips, with or without band pass filters, may be located in close proximity to each LED in the display for measuring LED light output during diagnostic/calibration operations.

As another alternative, a programmable chip may be located at each pixel so that each individual chip can be reprogrammed as necessary during each calibration sequence to raise or lower the effective light output of the LEDs contained in the pixel.

As an alternative to performing daily in situ calibration by looking at every pixel in sequence and adjusting the scaling value for each pixel, a statistical modeling approach may be used. According to this approach, selected LEDs or groups of LEDs may be run in iterative power cycles in order to optimize the overall screen color through statistical analysis to provide a new scaling value for each LED or group of LEDs.

When the diagnostic operation operates with an all white display, the three LEDs at each pixel may be evaluated individually and collectively to assure that the pixel is contributing the proper spectrum and amount of white light. Through a diagnostic/calibration software package that interrelates output and dominant wavelength response for each red/green/blue LED at a pixel to the desired white light response, an iterative calibration may be undertaken at each pixel to adjust the values contained in the diode recalibration scalar software or to reprogram programmable logic chips that determine the drive current for each LED located in a specific pixel.

Calibration can involve comparing feedback measurements for a single display element, a single portion of a display screen, or the entire display screen. Thus, as mentioned above, a comparison can involve a comparison between one or more feedback measurements and one or more baselines. In another embodiment, one can make multiple feedback measurements of the same element, portion, or display, and performance trends can be identified for making predictions regarding remaining light source lifetimes.

Alternatively, calibration can involve comparing feedback measurements for different portions of a display screen. For example, if a display screen is divided into four portions, a measurement can be made for each of the portions. If one of the portions has an illumination that is less than the other portions, the power supplied to the under performing light sources that contribute to that portion can be increased. If the power level can not be increased (e.g., when the power is already maximized), the power supplied to the other portions can be reduced, such that the illumination of each portion is substantially the same.

When calibrated, light sources 105 can emit desired ultraviolet light intensities on shutters 110. Each of shutters 110 can include a liquid crystal that has a variable field-dependent transmissivity at ultraviolet wavelengths. In one embodiment, the plurality of shutters can include at least three shutters and the plurality of luminescent elements can include at least three luminescent elements that luminesce at different colors when the ultraviolet light is incident. In another embodiment, the plurality of shutters can include multiple sets 112 of shutters 110 and luminescent elements 120, wherein each of sets 112 includes at least three shutters 110 and corresponding luminescent elements 120, wherein each set of luminescent elements 120 includes at least three luminescent elements that luminesce at different colors.

Screen 115 (shown in FIG. 2) performs the same function as screening element 40 of FIG. 1—namely, screen 115 diffuses ultraviolet light before it is incident on shutters 110 and may collimate and direct the ultraviolet light toward the shutters. Luminescent elements 120 can be disposed directly on the viewer's side of shutters 110 and in most respects are like luminescent elements 45 and 50 shown in FIG. 1. Luminescent elements 120 can also be disposed on the light-source side of shutters 110, but such an arrangement would reduce the lifetimes of the luminescent elements because those elements would be continuously exposed to the ultraviolet light, even when those elements are not in use.

Regulated power supply 125 can include a power source 135 and a regulation circuit 140 coupled to a power source 135 and light sources 105. Regulation circuit 140 can include one or more photodetectors 108, a comparator circuit 145, and an LED controller 150. As shown, photodetectors 108 detect portions of ultraviolet light emitted from at least one of light sources 105 and generates first signals that are indicative of intensities of the portions of the ultraviolet light. It will be appreciated, however, that photodetectors can also be positioned on the viewer's side of luminescent elements 120 to detect visible light converted by luminescent elements 120. Also, as discussed more fully above, digital cameras can be used to monitor light intensities.

Comparator circuit 145 includes at least one input for receiving the first signals. Circuit 145 compares the first signals with at least one baseline signal and generates second signals that are proportional to the difference between the first signals and the at least one baseline signal. It will be appreciated that although FIG. 2 only shows a single input from all of photodetectors 108 for illustrative clarity, each of photodetectors 108 preferably has a separate line that supplies the corresponding first signals to comparator circuit 145. It will also be appreciated that circuit 145 can include multiple comparator subcircuits, each of which performs a separate comparison for each of the first signals. These subcircuits can be either centralized or distributed and adjacent each of photodetectors 108. Finally, each comparison can use a common baseline signal or a different base line signal, depending on the particular geometry, number, and type of contributing light sources.

As discussed above with respect to display element 10, photodetectors 108 of display device 100 can be positioned such that the portion of detected light is a portion reflected from screening element 115. In another embodiment, each of photodetectors 108 can be positioned such that the portion of detected light reflects from some other element, such as a small mirror placed in front of light source 105. In either of these cases, each of photodetectors 108 includes a detector that detects the intensity of the ultraviolet light. In another embodiment, photodetectors 108 can be positioned such that the portions of detected light are portion of visible light emitted from one or more luminescent elements. As discussed herein, these detectors can be used to perform illumination calibration procedures, if desired.

LED controller 150 distributes power to each of light sources 105. LED controller 150 can illuminate light sources 105 simultaneously or sequentially. Simultaneous illumination of light sources 105 allows each participating light source to operate at a reduced power because two or more sources can share the burden of illuminating one or more luminescent elements 120. Sequential illumination of light sources 105 can be used to minimize the amount of time that each light source is active. In both cases, light source longevity can be extended, depending on the characteristics of the light sources themselves.

Accordingly, consistent with another aspect of the current invention, a method for managing power to an ultraviolet-stimulated display device is provided. The display device can include multiple ultraviolet light sources, multiple independently controllable shutters, a luminescent element optically aligned with each of the shutters, and a regulated power supply for supplying power to the light source. As described above, a screen can be located between the light source and the liquid crystal device. The method includes receiving information that identifies a set of luminescent elements, determining which of the light sources should be powered to illuminate the identified luminescent elements during a period of time, and distributing power to the determined light sources during that period of time. This sequence can be repeated many times according to a stream of information, such as a video signal.

The step of receiving information can involve receiving a set of desired visible light intensities (e.g. intensity information) for each of the identified luminescent elements. The step of determining can include, for example, determining a set of power levels for each of the light sources and/or determining a set of shutter openings for each of the shutters corresponding with the set of identified luminescent elements. The step of determining can also include determining a power distribution scheme that could distribute power to the appropriate light sources simultaneously or sequentially. Alternatively, a single scheme could involve distributing power to one portion of the screen in a simultaneous manner and another portion of the screen in a sequential manner.

If a sequential power distribution scheme is desired, the power level supplied to a first light source can be different from the power level supplied to a second light source during a relevant period of time, even though both light sources could illuminate the same luminescent element. For example, rather than powering two light sources simultaneously, power could be supplied to a first light source during the first period and a second light source during the second period, where the sum of both the first and second periods is less than about $1/30^{th}$ of a second. This type of illumination scheme could involve supplying power to two light sources in an alternating fashion or supplying power to three or more light sources in a cyclical fashion.

Another way to extend light source longevity is to coordinate LED controller 150 and shutter controller 160. By coordinating controllers 150 and 160, LED controller 150 only needs to supply power to a limited number of light sources 105 when those sources are needed to illuminate certain identified shutters. For example, if a portion of a display screen is programmed to be dark (i.e., off), then the light sources that supply ultraviolet light to that portion, as well as the shutters associated with that portion, can be turned off. By selectively turning light sources off when they are not needed, their useful lifetimes are increased. It will be further appreciated that a master controller 170 can be used to coordinate LED controller 150 and shutter controller 160. In an alternative embodiment, LED controller 150 and shutter controller 160 can be connected directly together. In this case, shutter controller 160 can supply LED controller 150 the information it needs to determine which light sources should be turned off.

Also, device 100 can include a cooling plenum that can be in thermal communication with any or all heat generating components, including especially light sources 105. The plenum can include a cooling material, such as a gas or fluid, and can include a circulation motor for circulating the air or fluid.

Like display element 10, display device 100 can include one or more filters 130. For example, a protective filter can be placed on a viewer side of luminescent elements 120 to remove potentially harmful ultraviolet radiation that may pass through the luminescent elements. Filter 130 can be a coating disposed directly on luminescent elements 120 (as shown) or it can be disposed on another filter, such as a wavelength stabilizing filter, as discussed above. Alternatively, filters 130 can be separate from luminescent elements 120, that is a gap may be formed between filters 130 and luminescent elements 120.

In addition to using ultraviolet-stimulated electroluminescent elements, a display device can be constructed that includes multiple LEDs that emit the same color (or different colors) for one pixel location to produce the desired light output. For example, three 1.5 milliwatt blue LEDs can be used to produce a 4.5 milliwatt blue light output. In one embodiment, each red, green, and blue emitter can be accessed with a 24 bit resolution, which provides 16.7 million colors for every pixel. As used herein, the term "pixel" refers to the smallest variable-color element of a display device. That is, a pixel is the basic logical unit of programmable color on a display device. Thus, the greater the number of pixels per unit length or area, the greater the resolution of the display.

An overall display of 23 feet by 33½ feet, so constructed, has a high spatial resolution defined by approximately 172,000 pixels at an optical power that is easily viewable in bright sunlight. Suitable display modules for displays 30 are under sold under model No. LV50 by Lighthouse Technologies of Hong Kong, China that use, for blue and green light, InGaN LEDs fabricated on single crystalline $Al_2O_3$ (sapphire) substrates with a suitable buffer layer, such as AlN. For red light, super bright AlInGaP LEDs fabricated on a suitable substrate such as GaP, can be used.

Such a panel display device can have a useful life in excess of 50,000 hours, for example, which may still be less than the 150,000 hours or more contemplated for use in network 200. To increase panels' useful lifetimes, panels can be cooled from the back of the displays, preferably via a cooling plenum (e.g., plenum 91 of FIG. 1 and plenum 109 of FIG. 2), that may be a refrigerant-based, air conditioning system (not shown), such as a forced air system or a thermal convection or conduction system. Non refrigerant-based options may be used in locations where they produce satisfactory cooling. Displays consistent with this invention preferably include a wide viewing angle, for example, 160 degrees.

Although displays sold by Lighthouse Technologies use InGaN on sapphire and AlInGaP on GaP LEDs (which are described herein, as well as InGaN on SiC), other materials may also be used to make the LEDs as follows:
  1. (Blue/green) InGaN on SiC, preferably with a suitable buffer layer such as AlN
  2. (Blue/green) InGaN on GaN
  3. (Blue/green) InGaN on AlN, preferably with a suitable buffer layer such as AlN.
  4. (Blue/green) AlN or AlN-containing compound on AlN, sapphire or SiC.

It will be appreciated that the InGaN/sapphire combination and other solid state LED combinations described above can have substrates with high optical transmissivity and produce high optical powers. These properties can be important for a number of reasons, including providing electronic display designers the ability to create very wide viewing angles up to approximately 160 degrees, and increasing display visibility for viewers in oncoming traffic.

Illustrative examples of metal-activated phosphors that can be used consistent with this invention are provided below. Examples of metal activated phosphors that emit green light include: ZnCdS:Ag, ZnS:Cu,Al, and $Zn_2SiO_4$:

Mn, all of which emit light between about 520 nm and about 560 nm. An example of a metal-activated phosphor that emits blue light is ZnS:Ag, which has an emission peak at about 460 nm.

Display of Commercial Advertising and Other Content

Figure 3:
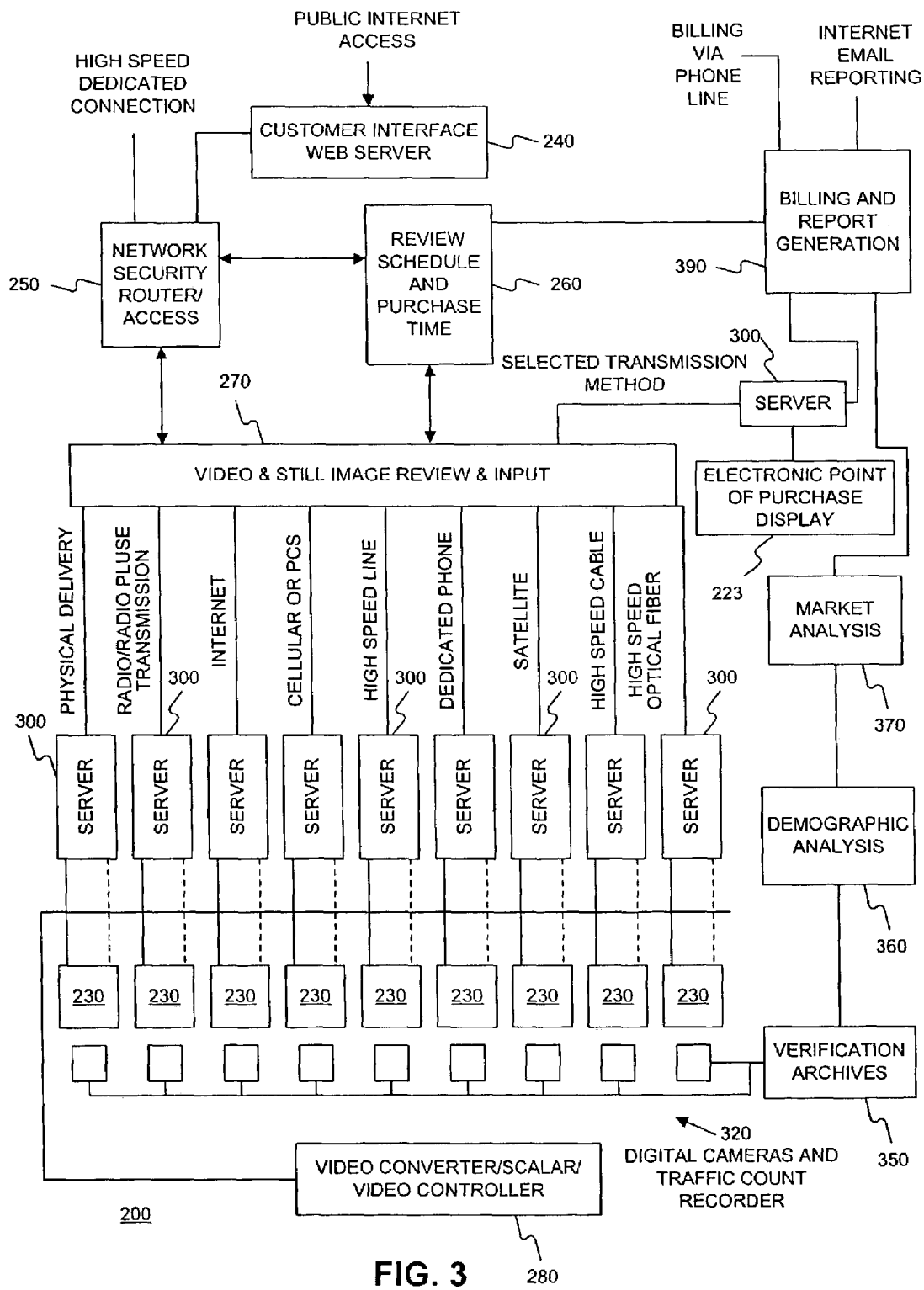
FIG. 3 shows an illustrative block diagram showing the principal components of a system for advertising consistent with this invention.

FIG. 3 shows a block diagram of system 200 for direct placement of commercial advertisements, public service announcements and other content on electronic displays. System 200 includes a network comprising a plurality of electronic displays 230 that that can be located in high traffic areas in various geographic locations. The displays may be located in areas of high vehicular traffic, and also at indoor and outdoor locations of high pedestrian traffic, as well as in movie theaters, restaurants, sports arenas, casinos or other suitable locations. Thousands of displays, up to 10,000 or more displays worldwide, may be networked according to the present invention. In one embodiment, each display is a large (e.g., 23 feet by 33½ feet), high resolution, full color display that provides brilliant light emission from a flat panel screen, such as a display device described above consistent with this invention.

A customer of system 200, such as an in-house content provider or an agent of a consumer products company, may access a central information processing station of the system via the Internet through customer interface web server 240. Server 240 may have a commerce engine and permit the customer to obtain and enter security code and billing code information into network security router/access module 250. Alternatively, high usage customers of the system may utilize a customer interface comprising a high speed dedicated connection to module 250.

Following access, the customer can review options concerning his order by reviewing available advertising time/locations through review schedule and purchase time module 260, which permits the customer to see what time is available on any display in a geographical region (e.g., throughout the world) and thereafter schedule and purchase the desired advertising time slot. Next, the customer transmits the advertising content on-line through the Internet, a direct phone line, or a high speed connection (for example, ISDN, or other suitable high speed information transfer line) for receipt by video & still image review and input module 270. In parallel, the system operator may provide public service announcements and other content to module 270. The content, whether still image or video, can be formatted in NTSC, PAL, SECAM, YUV, YC, VGA or any other suitable format. In one preferred embodiment, the format is VGA, while all other formats, including but not limited to NTSC, PAL and SECAM, can be run through the video converter 280.

Video & still image review and input module 270 can permit a system security employee to conduct a content review to assure that all content meets the security and appropriateness standards established by the system, prior to the content being read to server 300 associated with each of displays 230 where the content being transmitted to server 300 can be displayed. Preferably, servers 300 are located at their respective displays and each can have a backup. An example of a suitable server that can be used consistent with this invention is sold under model number RS/6000, available from International Business Machines Corporation, of Armonk, N.Y. It will also be appreciated that one of servers 300 can be associated with point-of-purchase display 223, although it will be appreciated that electronic point-of-purchase display device 223 and its associated server are optional.

The means for transmitting content information to the display locations may take a number of forms, with it being understood that any form, or combination thereof, may be utilized at various locations within the network. As shown in FIG. 3, the means can include a high speed cable, a satellite, a dedicated phone, a high speed line (e.g., ISDN, ADSL), a cellular network, PCS or other data transmission at available frequencies, an Internet connection, a radio/radio pulse transmission, a high speed optical fiber, and a physical delivery of digitally stored information medium.

The video converter/scalar and video controller functions provided by module 280 may be utilized in connection with servers 300 and associated displays 230 that require them, according to data transmission and required reformatting practices well known in the art.

Verification that advertisements do, in fact, run at the intended time at the intended displays may be provided by an information storage module (not shown) linked to each display. Another form of verification may be achieved by digital camera and traffic count recorder 320 that continuously records the content appearing at its respective display 230 and digitally transmits video verification information to verification archives module 350. Recorder 320 also provides traffic count information (for example, 225 vehicles passed the display while an advertisement ran) to verification archives module 350.

Information from verification archives module 350 can be used by demographic analysis module 360 and market analysis module 370 to generate information for reports for customers after advertising. Thus, analysis data from modules 360 and 370 can be transmitted to billing and report generation module 390 where reports are assembled showing, for example, the time of the advertisement, the content of the advertisement, the traffic count and residence/median income information about those who saw the advertisement.

A representative, simplified report for an advertisement provided to a single display is shown in FIG. 5. A representative, simplified report for an advertisement provided to multiple displays (e.g., 100 displays) is shown in FIG. 6:

Module 390 can also produce bills that may be transmitted by phone lines for a debit payment such as a direct bank draft, or other suitable payment mode.

FIG. 4 shows a perspective view of one preferred form for electronic display device 230 of FIG. 3. In this embodiment, display 230 takes the form of a 23 feet by 33½ feet seamless flat screen display including multiple flat panel display modules. The panels can use advanced semiconductor technology, as described above, to provide high resolution, full color images that use LEDs capable of emitting a high optical power (about 1.5–10 milliwatts, or greater) that are aligned in an integrated array with each pixel having a red, green and blue LED.

It will be appreciated that split screen images may be displayed on displays 230. In a simple application, a still image advertisement can be one half corporate logo and one half scenery. Beyond this application, split screen capability can be used to present a portion of the image as a corporate logo, or the like, and the remainder either real time (or near real time) video or still frame. For example, a previously qualified customer with acceptable internal content review procedures may have direct access to a display or displays for the purpose of displaying a real time (or near real time) sports event, news event, or the like, in conjunction with the customer's corporate logo. This display may be achieved by utilizing high speed servers 300 or by bypassing the servers altogether. High speed still image or video transfer may be facilitated by compression techniques such as JPEG and MPEG II, known in the art.

While advertising scheduling and purchasing may take place as described above where customers directly purchase time from available slots according to a fixed fee schedule, it will be appreciated that alternative modes may be used. For example, an auction system, such as the one offered by eBay Inc., of San Jose, Calif. may be used where all previously purchased slots and all unsold slots are auctioned through a bid process (a "total" auction). Additionally, a limited auction can be used where time may be purchased and booked for a set price, but all time not purchased at the set price becomes available through auction at a fixed time before the run time, for example, one month before run time.

As another alternative for a portion of the available time slots, a high usage customer may establish a monthly advertising budget with the system operator that authorizes the operator to select the time slots for display of the customer's advertisements at "best available rate" pricing. This could take advantage of last minute availability of time slots and other time slot placement techniques that enable the operator to more completely utilize the network. These or similar time slot placement practices when used for a portion of the available time slots can be implemented by a software package that takes into account the needs of both the customer and the system operator.

It will be appreciated that advertising content information may be transmitted to the electronic display device locations by physically delivering a suitable information storage device such as CD ROM, zip drive, DVD ROM or DVD RAM. This approach may be utilized to transmit information to displays at any desired location, for example, to remote locations, to movie theaters, etc.

Distribution of Movies in Digital Form to Movie Theaters

Figure 7:
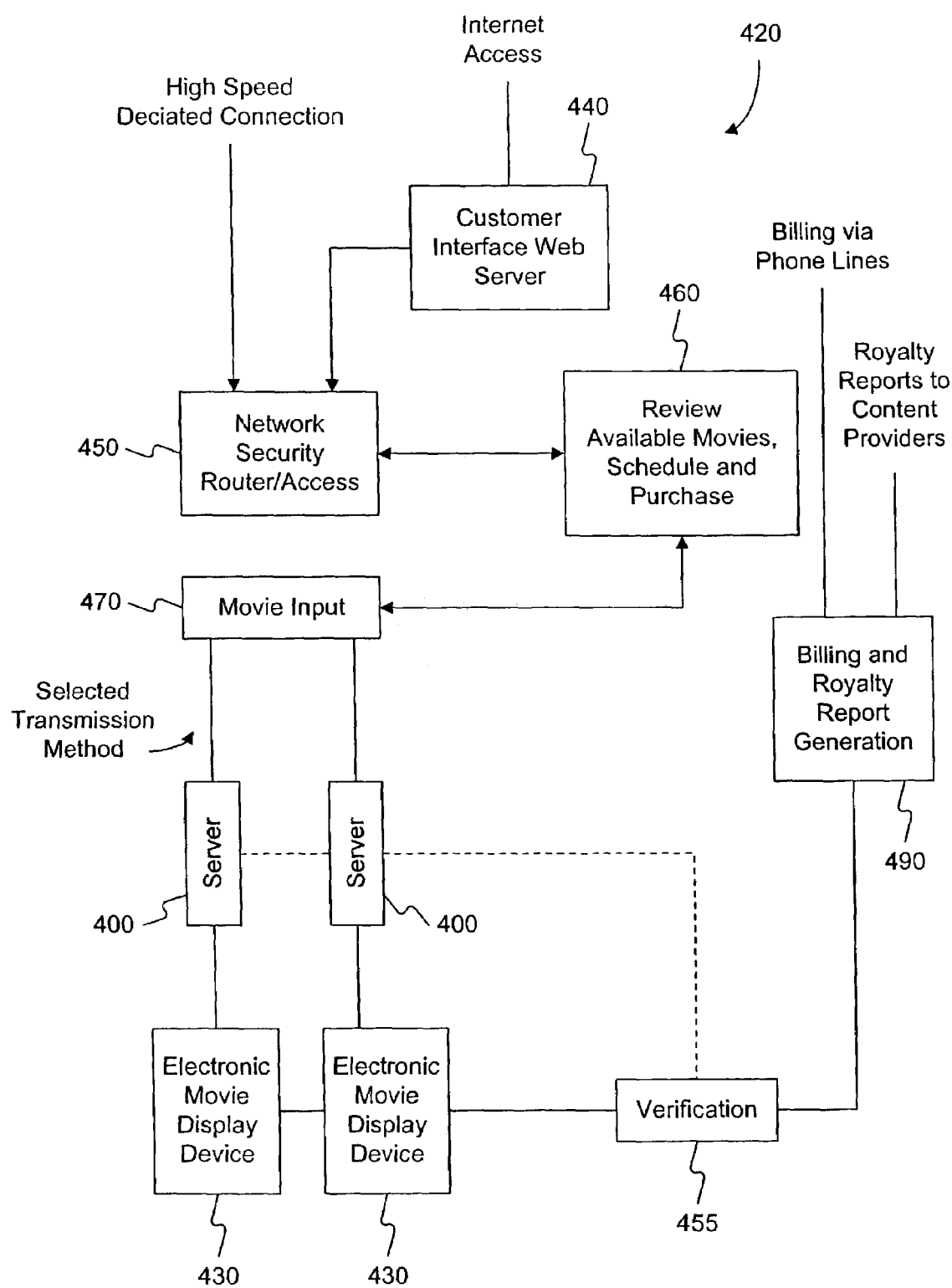
FIG. 7 shows a block diagram with principal components of an illustrative system for distributing digital movie content, including to movie theatres, consistent with this invention.

FIG. 7 shows a block diagram of illustrative system 420 for distribution of movie content in digital form to movie theaters. System 420 includes a network connecting plurality of electronic movie display devices 430, which may be located in movie theaters of customers of system 420. The movie theaters may be "single screen" theaters, which have only one display device 430, such as small art houses. The theaters may also be smaller theaters with only two or three screens up to large mega-theaters having twenty or more display devices 430. Electronic movie display devices 430 may take several forms, each of which is fully capable of displaying movies to an audience of 50–100 or more moviegoers. Various types of display devices 430 are described below.

A customer of system 420, which may be a responsible party representing the movie theater and referred to herein as a movie theater operator, may access a central information processing station of the system via the Internet through customer interface web server 440. Web server 440 can have a commerce engine and permit customers to obtain and enter security code and billing code information into network security router/access module 450. Alternatively, high usage customers of the system may utilize a customer interface comprising a high speed dedicated connection to module 450. Following access, the customer reviews options concerning his order by reviewing available movies through review available movies and purchase module 460 that permits the customer to see what movies are available, and thereafter schedule and purchase a movie for display utilizing one or more display devices 430.

Following scheduling and purchasing, the customer-ordered movie is transmitted to server 400, which can be associated with the customer's movie theater. In one embodiment, servers are located at respective displays 430 and each can have a backup. An example of a suitable server is the IBM RS/6000 server.

Means for transmitting digital movie content to the movie theaters can take a number of forms, with it being understood that any form, or combination thereof, can be used at various communication links of the network. In one embodiment consistent with this invention associated with the distribution of digital movies, a satellite uplink/downlink system can be used to transmit high speed, compressed, non-real time data on a plurality of channels. Each movie theater is in communication via a satellite downlink and has a decoder and a computer-based data storage device.

For example, a satellite may dedicate 100 channels to the continuous transmission of movies in non-real time, for example 3× real time transmission rates, so that approximately 4000 movies per day can be transmitted and are available for movie theater reception. The server (e.g., a storage device), which may be located at each movie theater, is programmed at the time the theater owner places an order for a movie to receive and store the particular movie when it is transmitted so that it can be available for screening at the theater at the desired time.

In addition to the above described satellite transmission system, other transmission systems (for example, those shown in FIG. 3) may be used either with real time or non-real time transmission. Thus, using a proprietary network of the present invention, a movie theater operator can schedule over the Internet the movies that operator wants to receive to his or her server(s).

Movie input 470 can be any source of digital movie content, such as a server, a combination of servers, or a connection to an off-site storage device. Input 470 can be programmed to provide movie content to servers 400 upon receipt, for example, of purchasing information from module 460. Verification unit 455 verifies that movie content is either being provided or has been provided to devices 430. Upon verification, billing and royalty report generation module 490 can be used to perform various ministerial bookkeeping and accounting functions, including the generation of billing and royalty reports.

Movies can be encoded so that they only play on a proprietary operating system. The operating system preferably has a modem that can be queried by the system's billing system on a periodic basis to bill the account. By continuously or periodically providing significant content through the satellite transmission system, movie producers, or other content owners, always have their content available for sale. Because the system can include its own receiver, server, and proprietary software system that supports the digital display (e.g., a digital projection unit), the encoded content transmitted to each theater can be protected from piracy.

In addition to the transmission techniques described above, it will be appreciated that the system may operate utilizing a "platter" of CD-ROM, DVD-RAM, DVD-ROM, tapes, or the like, on site at each server that is associated with each display device 430.

As stated above, any suitable type of digital movie display device can be used in movie theaters that are customers of system 420. Examples include:

1. A large, seamless, substantially flat screen LED display device having relatively low power LEDs suitable for low ambient light conditions of a movie theater.
2. A high resolution, full color display device utilizing high power LEDs providing a light source for an LCD shutter-type screen as described in U.S. Pat. No. 5,724, 062, which is incorporated by reference herein.

3. A projection system based on digital light processing ("DLP™") technology developed by Texas Instruments Incorporated, of Dallas, Tex. Complete electronic movie display systems utilizing the DLP™ technology are sold by various manufacturers, including Runco International of Hayward, Calif., which sells, for example, those sold under the trademark Reflection™ DLP™ projection systems, including model No. VX7.

4. A digital, flat panel, full color movie screen using reflective LCD technology developed, for example, by Hughes/JVC and Reflective Technology Industries Limited, of Winsford, Cheshire.

DLP® technology is a digital display solution that is particularly well-suited for large display devices. During operation, a light source emits white light that passes through a color wheel as it travels to the surface of a panel of micro-mirrors. Typically, the panel includes hundreds of thousands of separately addressable micro-mirrors that are spaced less than one micron apart, resulting in a 90% fill factor. The color wheel filters (i.e., prism) the light into red, green, and blue, from which a single-chip DLP™ projection system can create millions colors.

A DLP™ system is known to provide exceptional brightness that increases with resolution, and is less susceptible to degradation compared with many other large screen display solutions. Nonetheless, conventional DLP™ projection systems generally use inefficient, and therefore very hot, arc lamps to generate light and such lamps have limited lifetimes and must be replaced regularly. Moreover, the output spectrum of such a lamp tends to shift and weaken over time. Furthermore, the high temperatures that normally occur during operation of DLP™ systems also tend to degrade the micro-mirror panel.

Thus, consistent with another aspect of this invention, a DLP™ projection system is provided that includes a solid-state light source. The light source can be made using an ultraviolet-stimulated phosphor compound that emits substantially white light. Alternatively, the light source can be made using multiple ultraviolet-stimulated phosphor compounds that emit different colors over a period of time but when mixed form substantially white light. In another embodiment, the solid-state light source can include three separate groups of semiconductor light emitting diodes that each emits the desired dominant and peak wavelength. These devices can optionally be combined with a fourth UV-stimuateld device, to form a single white light source. These semiconductor devices can employ materials such as pigments and dyes in plastic to effectively provide a cutoff filter or more commonly a bandpass filter to regulate the spectral distribution of light.

In any case, the composite of the individual light sources can be formulated to mimic the human biological responsivity to visible light for a given ambient light condition. The term "condition" can refer to the spectral distribution of optical power versus wavelength. For example, at high ambient light conditions where the eye is less responsive (i.e., exhibits high biological responsivity) to blue light, more blue light can be added to provide a proper color relative to a baseline image that may have been produced under lower ambient lighting conditions.

Furthermore, systems consistent with this invention can incorporate one or more photodetecting devices and/or filters for monitoring ambient conditions. In one embodiment, the devices can form one or more solid-state spectrophotometers located in the viewing area to provide feedback for adjusting the projection system and the display generally. Thus, in first step, a measurement of the viewing room's ambient light level can be made. Then, based on that measurement, a look-up table or other baseline information can be used to determine an appropriate normalization curve for the projection system. Once the curve has been identified, the light source output spectrum can be appropriately adjusted to optimize the projected image and to obtain a more accurate color composition, which may measured against a predetermined standard. The advantage of this normalization method is that accurate color compositions and brightness levels can be achieved in any room, regardless of its ambient light.

Moreover, such projection systems is provided that includes micro-mirrors made from materials that are tolerant of high temperatures and exhibit minimal degradation after extended exposure to high temperatures. Wide energy band gap materials having gaps are especially useful for this purpose, although appropriately doped relatively narrow band gap materials can also be used. For example, high-temperature versions of silicon that are appropriately doped to operate repeatedly at high temperatures could be used. Also, 6H SiC, 4H SiC, SiO, GaN-based alloys, AlN-based alloys, GaAs-based alloys (but these may not be preferably due to lower thermal conductivity), InP-based alloys, and even diamond-based alloys. These can be grown using homo-epitaxial or hetero-epitaxial methods, with or without an appropriate buffer layer.

Figure 8:
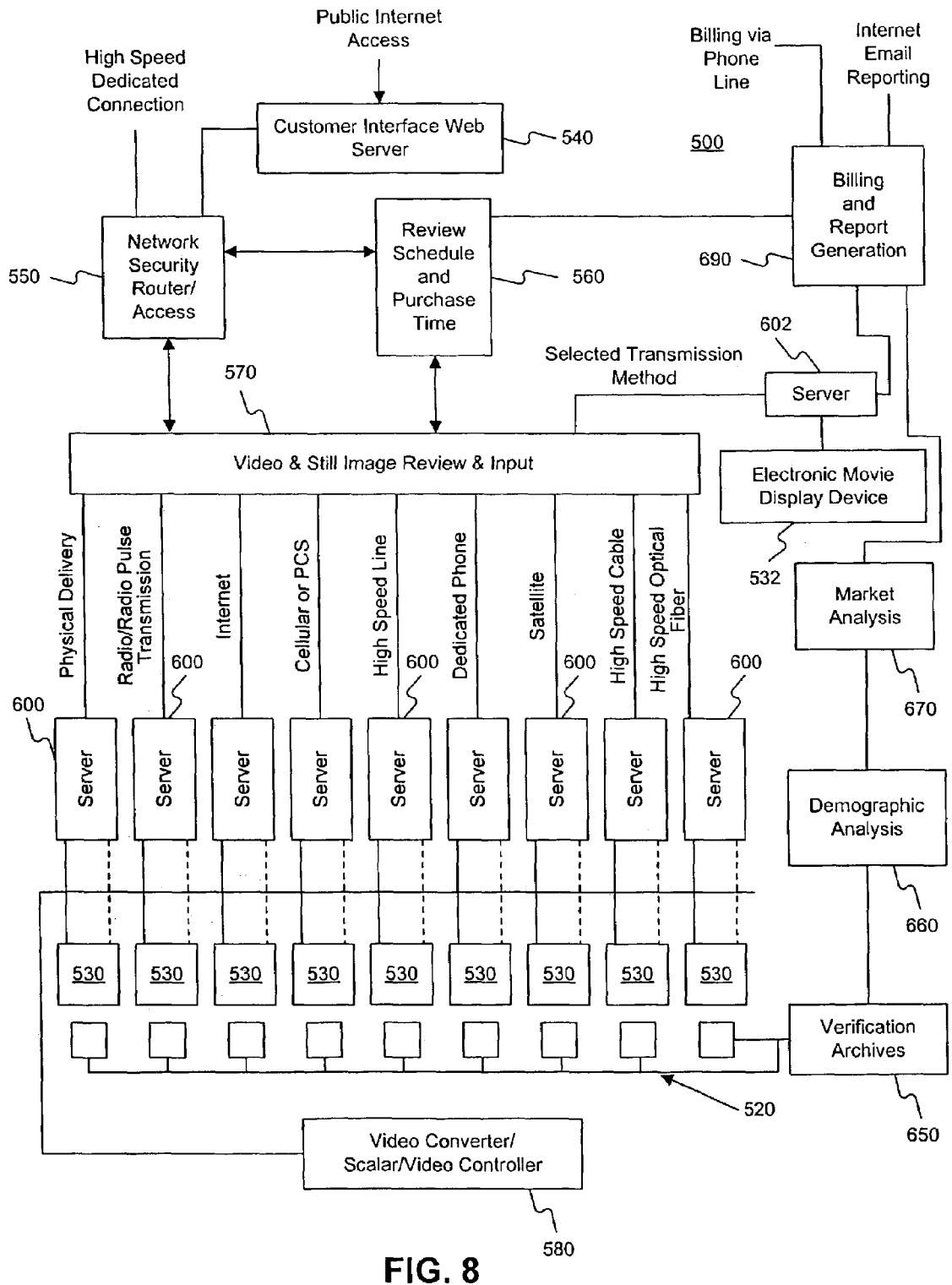
FIG. 8 shows a block diagram of another illustrative system for advertising consistent with this invention.

FIG. 8 shows another illustrative system 500 consistent with this invention. System 500 is similar to system 200, except that system 500 includes movie-related equipment. Thus, system 500 can include a plurality of electronic displays 530, customer interface web server 540, network security router/access module 550, review schedule and purchase time module 560, video & still image review and input module 570, video converter 580, servers 600, digital camera and traffic count recorders 520, verification archives module 650, demographic analysis module 660, market analysis module 670, and report generation module 690.

In addition to these network elements, electronic movie display device 532 can be used as a movie screen in a digital movie theater. Video & still image review and input module 570 can transmit advertising content (such as movie-related advertising content) to displays 530 in the manner described above in connection with the embodiment shown in FIG. 3 and transmit movie content in a digital format to electronic movie display device 532, which may be located at a movie theater, via server 602.

Figure 9:
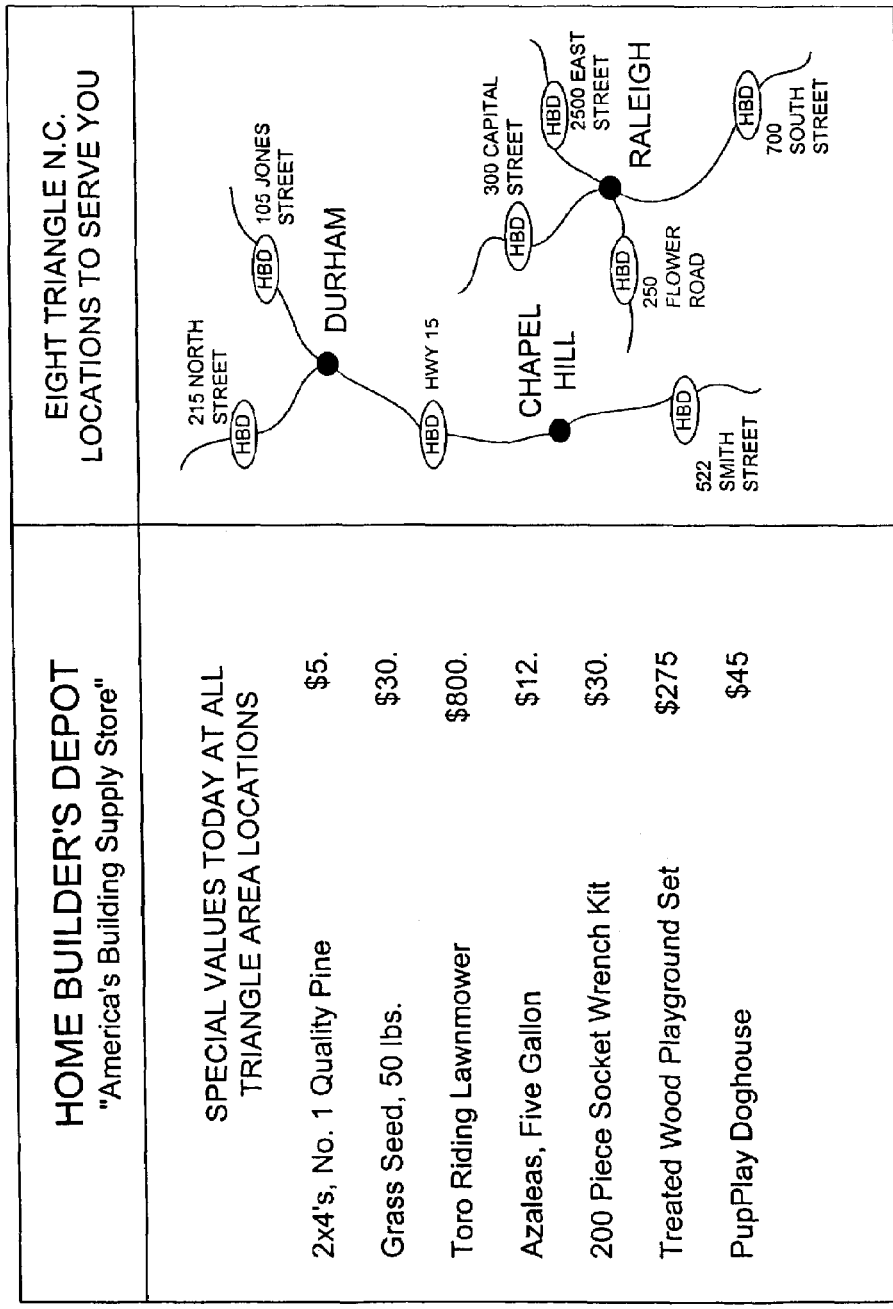
FIG. 9 shows an illustrative roadway-adjacent electronic display device on which an advertiser can place advertisements through a networked system consistent with this invention.
Figure 10:
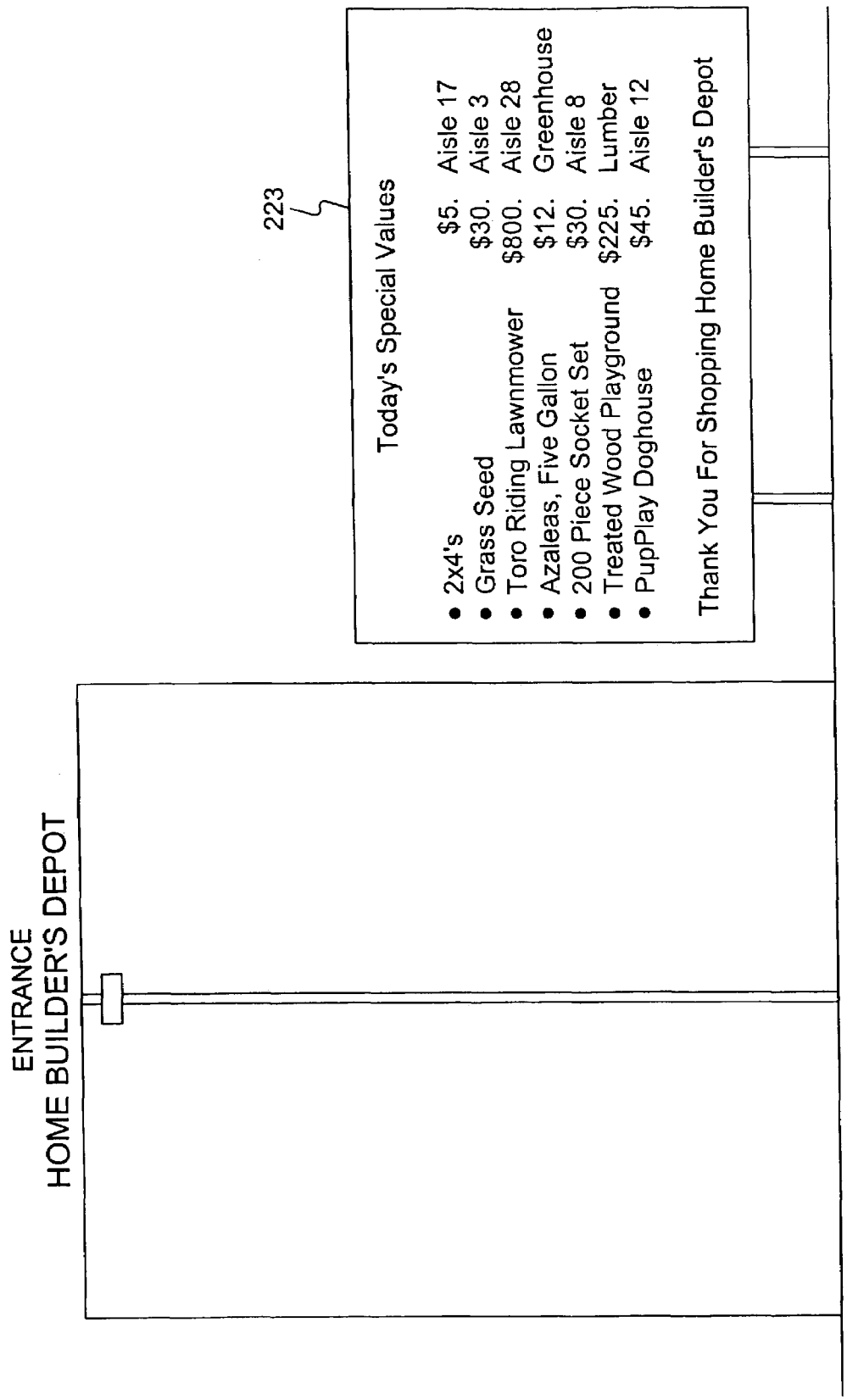
FIG. 10 shows an illustrative point-of-purchase electronic display device on which an advertiser can place advertisements that are related to the ones displayed on device shown in FIG. 9, for example, consistent with this invention.

FIGS. 9 and 10 show additional embodiments of the invention in which electronic display devices (e.g., devices 230 and 430) in the form of electronic billboards adjacent roadways are used in conjunction with point-of-purchase display units 223 located in, for example, retail stores. According to this embodiment, an advertiser, such as a chain of retail stores, can place advertisements on selected roadside display devices (e.g., devices 230 and 430), optionally at particular geographic locations or within a particular geographical region, to inform potential consumers of special values or promotional items at one or more places of business of the advertisers.

For example, as shown in FIGS. 9 and 10, an advertiser, such as "Home Building Depot," can place advertisements through system 200 at selected times and at selected locations, such as on any number of roadway-adjacent electronic display devices 231 (one device shown). The advertisement can, for example, inform consumers that certain items are on sale at the company's area stores. As shown in FIG. 9, various products and daily values can be listed on display device 231: 2×4's are $5.00, grass seed in fifty-pound bags is $30.00, a Toro riding lawn mower is $800.00, etc.

The advertisement at roadway-adjacent display device can also provide the location(s) of the company's local stores by street address, by map location, or both. In conjunction with this highway-adjacent billboard advertising method, the advertiser, Home Building Depot, can use point-of-purchase display devices at the local stores that tie into the billboard advertisement. For example, such a tie can be made by repeating the special sale items and prices and directing the customers to the store aisles where the particular products can be found. In one embodiment, point-of-purchase display device 223 can take the form of an electronic display device (e.g., as described above), or electronic ink display devices sold under the trademark IMMEDIA™ by E-Ink Corporation of Cambridge, Mass.

Electronic ink display devices can hold text for an extended period of time without consuming power and the message can be changed virtually instantly to a new message. In some embodiments, the format and content of display device 223 (electronic or otherwise) can be controlled by each store (i.e., system customer) without direct input from the other stores or the company's headquarters, other than to assure that the point-of-purchase displays 223 are coordinated with the company's roadway advertisements implemented through system 200, as shown in FIG. 10.

In another embodiment, the format and content of displays 223 can be controlled by the same person(s) who places the roadside billboard advertisements through system 200. For example, coordination of content between roadway-adjacent displays 230 and point-of-purchase display device 223 or electronic movie display device 532 can be achieved by using such display devices that have a format and display content that is controlled through a network from a personal computer. This control can be achieved through system 200 (or system 500), in which case devices 223 or display device 532 can be part of the network of electronic display devices (e.g., FIGS. 3 and 8), with data transmission being carried out as described above.

In this regard, because of the small amount of information needed for communicating a simple message for certain types of electronic point-of-purchase display devices 223, satellite paging communications systems can be used to transmit data to display devices 223. Alternatively, each retailer that uses system 200 for its roadside sign advertising may connect display devices 223 through the Internet, a private intranet, or any other suitable means.

Thus it is seen that display devices, as well as display elements for use in display devices, are provided. A display element can include a first light source that emits ultraviolet light, a liquid crystal device having a plurality of independently controllable (i.e., addressable) shutters, and a plurality of luminescent elements optically aligned with each of the shutters, wherein each of the luminescent elements absorbs at least some of the ultraviolet light and converts it to visible light. The display element can also include a screening element between the light source and the liquid crystal device, More generally, a system is provided that permits video or still image content to be displayed on networked electronic display devices with geographical and temporal restrictions.

One skilled in the art will appreciate that the present invention can be practiced by other than the described embodiments, which are presented for purposes of illustration and not of limitation. For example, roadside or other electronic displays 230 can take any suitable form that provides the resolution, brightness and other image properties necessary for a particular application, such as the use of the above-mentioned electronic ink displays. The present invention is limited only by the claims which follow.

What is claimed is:

1. A display element for use in a display device, wherein the element comprises:
   a first light source that emits ultraviolet light;
   a liquid crystal device having a plurality of independently controllable shutters;
   a plurality of luminescent elements optically aligned with the plurality of shutters, wherein at least one of the luminescent elements absorbs at least some of the ultraviolet light and converts it to visible light, wherein the luminescent elements are disposed on the liquid crystal device, wherein the luminescent elements luminesce at different colors, wherein at least one of the luminescent elements comprises a material selected from a group consisting of a semiconductor, a phosphor, a gas, a plasma, an organic pigment, an inorganic pigment, and any combination thereof; and
   a regulation circuit for regulating a power supply that supplies power to the light source, wherein the circuit is coupled to the power supply and the first light source, and wherein the regulation circuit comprises:
   a photodetector that detects a portion of the ultraviolet light emitted from the light source and generates a first signal that is indicative of an intensity of the portion of light, wherein the photodetector is positioned such that the portion of the light is a reflected portion of the ultraviolet light,
   a comparator circuit having an input for receiving the first signal, wherein the comparator circuit compares the first signal with a baseline signal and generates a second signal that is proportional to the difference between the first signal and the baseline signal, and
   a controller circuit having an input for receiving the second signal and an output for supplying a regulated power signal to the light source.

2. The display element of claim 1 wherein the first light source is a light emitting diode.

3. The display element of claim 2 wherein the first light source is a surface-mounted light source.

4. The display element of claim 2 further comprising a second light source, and wherein the light sources emit a substantially equal intensity of the visible light on at least one of the luminescent elements.

5. The display element of claim 2 further comprising a second light source that emits ultraviolet light.

6. The display element of claim 5 wherein the second light source is active only when the first light source is inactive.

7. The display element of claim 6 wherein the second light source is adjacent the first light source such that the first and second light sources emit the light over a similar spatial profile.

8. The display element of claim 1 wherein the plurality of shutters have a variable transmissivity at energies that correspond to the ultraviolet light.

9. The display element of claim 1 wherein the plurality of shutters comprises at least three shutters and wherein the plurality of luminescent elements comprises at least three luminescent elements that luminesce at different colors when the light is incident on the elements.

10. The display element of claim 1 wherein the plurality of shutters comprises at least two sets of the shutters, and wherein each of the sets of the shutters comprises at least three shutters, and wherein each of the plurality of luminescent elements comprises at least two sets of the luminescent elements, and wherein each of the sets of the luminescent elements comprises at least three luminescent elements that luminesce at different colors when the light is incident on the elements.

11. The display element of claim 1 further comprising a screening element between the light source and the liquid crystal device that diffuses and collimates the light before being incident on the liquid crystal device.

12. The display element of claim 1 wherein the shutter has a light source side and a viewing side, and wherein the luminescent elements are located on the viewing side.

13. The display element of claim 1 wherein the plurality of luminescent elements comprises an element that luminesces substantially white light.

14. The display element of claim 1 wherein the reflected portion is reflected at least in part by a screening element located between the first light source and the plurality of luminescent elements.

15. The display element of claim 1 wherein the controller circuit is selected from a group consisting of a voltage controller and a current controller.

16. The display element of claim 1 further comprising a shutter controller that opens and closes each of the shutters, and wherein the controller circuit has an auto-zeroing feature that minimizes dark current when a shutter is closed.

17. The display element of claim 1 wherein the photodetector comprises at least one digital camera.

18. The display element of claim 1 further comprising a cooling plenum in thermal communication with the light source, wherein the plenum comprises a cooling material selected from a group consisting of gas and liquid.

19. The display element of claim 1 further comprising an optical protective filter on a viewer side of the luminescent elements that filters at least a portion of the ultraviolet light.

20. The display element of claim 19 wherein the filter is selected from a group consisting of a coating disposed on the liquid crystal device and a discrete filtering element.

21. The display element of claim 1 further comprising an optical stabilizing filter on a viewer side of at least one of the plurality of luminescent elements, wherein the stabilizing filter transmits a portion of the visible light, and wherein the portion includes a peak visible wavelength of the at least one of the plurality of luminescent elements.

22. A display device comprising:
a plurality of light sources that emits ultraviolet light;
a plurality of independently controllable shutters;
a plurality of luminescent elements optically aligned with each of the shutters,
wherein at least one of the luminescent elements absorbs at least some of the ultraviolet light and converts it to visible light; and
a regulated power supply for supplying power to the light source, wherein the regulated power supply comprises:
a power source, and
a regulation circuit coupled to the power source and the plurality of light sources, wherein the regulation circuit comprises:
a plurality of photodetectors that detects portions of light emitted from at least one of the plurality of light sources or and generates first signals that are indicative of intensities of the portions of light, wherein the plurality of photodetectors is positioned such that the portions of the ultraviolet light are portions reflected, at least in part, by a screen located between the light source and the liquid crystal device,
a comparator circuit having at least one input for receiving the first signals, wherein the comparator circuit compares the first signals with at least one baseline signal and generates second signals that are proportional to the difference between the first signals and the at least one baseline signal, and
a controller circuit having at least one input for receiving the second signals and at least one output for supplying regulated power signals to the plurality of light sources.

23. The display device of claim 22 wherein the plurality of light sources comprises a plurality of light emitting diodes.

24. The display device of claim 23 wherein the plurality of light sources are surface-mounted to a substantially planar structure.

25. The display device of claim 23 wherein the plurality of light sources comprises at least a first light source and a second light source, wherein the first light source is adjacent the second light source such that both sources emit light over a similar spatial profile, and wherein the power supply only supplies power to one of the first and second light sources at a time.

26. The display device of claim 22 wherein the plurality of light sources is in a substantially two-dimensional array, and wherein the power supply supplies an amount of electrical power to each of the plurality of light sources such that each of the plurality of shutters has substantially the same amount of ultraviolet light incident on it.

27. The display device of claim 26 wherein the plurality of light sources comprises:
a first light source; and
a second light source, and wherein the power supply adjusts the amount of electrical power to at least the second light source when the first light source fails.

28. The display device of claim 26 wherein the power supply includes a power management circuit that distributes power to each of the plurality of light sources such that each of the plurality of luminescent elements emits substantially the same amount of visible light when illuminated with the ultraviolet light.

29. The display device of claim 22 wherein each of the plurality of shutters comprises a liquid crystal and has a variable field-dependent transmissivity at energies that correspond to the ultraviolet light.

30. The display device of claim 22 wherein the plurality of shutters comprises at least three shutters and where each of the plurality of luminescent elements comprises at least three luminescent elements that luminesce at different colors when the light is incident on the elements.

31. The display device of claim 22 wherein the plurality of shutters comprises at least two sets of the shutters, and wherein each of the sets of the shutters comprises at least three of the shutters, and wherein each of the plurality of luminescent elements comprises at least two sets of the luminescent elements, and wherein each of the sets of the luminescent elements comprises at least three luminescent elements that correspond to the at least three shutters, and wherein the luminescent elements luminesce at different colors when the ultraviolet light is incident thereon.

32. The display device of claim 22 further comprising a screen between the light source and the liquid crystal device, wherein the screen diffuses and collimates the ultraviolet light emitted from the sources and directs the ultraviolet light toward at least one of the shutters.

33. The display device of claim 22 wherein each of the shutters has a light source side and a viewing side, and wherein each of the luminescent elements are located on the viewing side.

34. The display device of claim 22 wherein each of the luminescent elements are disposed on one of the shutters.

35. The display device of claim 34 wherein each of the at least two of the luminescent elements luminesce at a different color.

36. The display device of claim 35 wherein the plurality of luminescent elements comprises an element that luminesces substantially white light.

37. The display device of claim 35 wherein at least one of the luminescent elements-comprises a material selected from a group consisting of a semiconductor, a phosphor, a gas, a plasma, an organic pigment, an inorganic pigment, and any combination thereof.

38. The display device of claim 22 wherein the controller circuit is selected from a group consisting of a voltage controller and a current controller.

39. The display device of claim 22 further comprising a cooling plenum in thermal communication with the plurality of light sources.

40. The display device of claim 22 further comprising an optical protective filter on a viewer side of the plurality of the luminescent elements that filters at least a portion of the ultraviolet light emitted by the plurality of the light sources.

41. The display device of claim 40 wherein the protective filter is a coating disposed on a viewer's side of the luminescent elements.

42. The display device of claim 22 further comprising an optical stabilizing filter on a viewer side of at least one of the plurality of luminescent elements, wherein the stabilizing filter transmits a portion of the visible light, wherein each of the portions includes a peak visible wavelength of the at least one of the plurality of luminescent elements.

43. The display device of claim 42 wherein the stabilizing filter is selected from group consisting of a coating disposed on the at least one of the plurality of luminescent elements and an element that is discrete from the liquid crystal device.

44. A display element for use in a display device, wherein the element comprises:
   a first light source that emits ultraviolet light;
   a liquid crystal device having a plurality of independently controllable shutters;
   a plurality of luminescent elements optically aligned with the plurality of shutters, wherein at least one of the luminescent elements absorbs at least some of the ultraviolet light and converts it to visible light, wherein the luminescent elements are disposed on the liquid crystal device, wherein the luminescent elements luminesce at different colors, wherein at least one of the luminescent elements comprises a material selected from a group consisting of a semiconductor, a phosphor, a gas, a plasma, an organic pigment, an inorganic pigment. And any combination thereof and
   a regulation circuit for regulating a power supply that supplies power to the light source, wherein the circuit is coupled to the power supply and the first light source, and wherein the regulation circuit comprises:
   a photodetector that detects a portion of the ultraviolet light emitted from the light source and generates a first signal that is indicative of an intensity of the portion of light, wherein the photodetector is positioned such that the portion of the light is a reflected portion of the ultraviolet light, wherein the reflected portion is reflected at least in part by a screening element located between the first light source and the plurality of luminescent elements,
   a comparator circuit having an input for receiving the first signal, wherein the comparator circuit compares the first signal with a baseline signal and generates a second signal that is proportional to the difference between the first signal and the baseline signal, and
   a controller circuit having an input for receiving the second signal and an output for supplying a regulated power signal to the light source.

* * * * *

UNITED STATES PATENT AND TRADEMARK OFFICE
CERTIFICATE OF CORRECTION

PATENT NO. : 7,088,335 B2 Page 1 of 1
APPLICATION NO. : 10/444079
DATED : August 8, 2006
INVENTOR(S) : Hunter et al.

It is certified that error appears in the above-identified patent and that said Letters Patent is hereby corrected as shown below:

Column 28, Claim 44, line 16, "…pigment. And any combination thereof and …", please delete and replace with, --…pigment, and any combination thereof; and …--

Signed and Sealed this

Twenty-eighth Day of November, 2006

JON W. DUDAS
*Director of the United States Patent and Trademark Office*